US005574356A

United States Patent [19]
Parker

[11] Patent Number: 5,574,356
[45] Date of Patent: Nov. 12, 1996

[54] ACTIVE NEUTRAL CURRENT COMPENSATOR

[75] Inventor: Kevin L. Parker, Monroeville, Pa.

[73] Assignee: Northrop Grumman Corporation, Los Angeles, Calif.

[21] Appl. No.: 272,346

[22] Filed: Jul. 8, 1994

[51] Int. Cl.$^6$ ........................................................ G05F 1/70
[52] U.S. Cl. ................................ 323/207; 323/211; 363/40
[58] Field of Search .................................... 323/266, 207, 323/211; 363/40, 55, 80, 97

[56] References Cited

U.S. PATENT DOCUMENTS

| | | | |
|---|---|---|---|
| 4,967,334 | 10/1990 | Cook et al. | 363/34 |
| 5,343,079 | 8/1994 | Mohan et al. | 363/40 |
| 5,416,688 | 5/1995 | Levin | 363/39 |

Primary Examiner—Peter Wong
Assistant Examiner—Shawn Riley
Attorney, Agent, or Firm—Walter G. Sutcliff

[57] ABSTRACT

An active power conditioner for mitigating zero-sequence currents in electrical distribution by items wherein a multi-phase, neutral-forming structure employs a controllable voltage source, which source is controlled by a current-responsive voltage controller, to cancel an equivalent impedance of the multi-phase, neutral-forming structure so that zero-sequence currents are shunted to ground, thereby effectively nullifying the zero-sequence current respective to the source. The multi-phase neutral-forming structure may include multi-phase, neutral-forming autotransformers, zig-zag autotransformers, grounded-wye/unloaded-delta transformers and the like. While zero-sequence fundamental harmonic currents may be selectively shunted to ground, positive- and negative-sequence currents may remain essentially unaffected. The compensating action employed herein may be purely reactive in nature and thus consume little real power.

26 Claims, 9 Drawing Sheets ns. 5,574,356

ACTIVE NEUTRAL CURRENT COMPENSATOR

BACKGROUND OF THE INVENTION

1. Field of the Invention

This invention relates to power conditioners for electrical distribution systems, particularly to active power conditioners, and especially to active power conditioners for mitigating zero-sequence currents in electrical distribution systems.

2. Description of the Prior Art

In a balanced three-phase, four-conductor electric power system, the algebraic sum of the source phase voltages, or source line-to-neutral voltages, is zero volts. Hence, in a WYE-connected system with balanced phase voltages and a balanced linear load, the neutral current, $I_n$, is zero amperes, and the currents in the three phases are all equal in magnitude but differ by 120° in Itime phase. A multi-phase load in which the impedance in one or more phases differs from those of other phases is said to be unbalanced. Many types of loads on current electric power.systems can be non-linear and unbalanced. Such loads can generate certain harmonics of currents and voltages in the phases of a three-phase system. Unbalanced loading can result in a fundamental (60 Hz) neutral current. Also, one consequence of non-linear loading of electric power systems is an increase of harmonic current in the neutral path.

In general, a current which appears in the neutral path at fundamental and harmonic frequencies as a result of non-linear loading or unbalanced loading may be termed a zero-sequence current. Zero-sequence currents in each of the phases can cause zero-sequence currents to appear in the neutral path. In power systems that supply a substantial non-linear load, neutral currents may exceed the rated ampacity of the neutral path, resulting in elevated temperatures and increased thermal losses in the neutral conductors and terminations. In extreme cases, excessive heating losses may damage the insulation of the neutral conductor and other conductors in the same conduit, causing the neutral conductor to fail as an open circuit, or damage materials in contact with the neutral.

A number of approaches have been applied to prevent or eliminate instances of neutral thermal overload. These include: (1) installing components with increased ampacity in the neutral path; (2) applying transformer arrangements to shunt zero-sequence currents out of the neutral path; and (3) using passive and active filters to shunt harmonic currents out of the neutral path.

Installing components with increased ampacity in the neutral path typically requires retrofitting existing electrical systems with either an upgraded neutral ampacity or a parallel neutral path. In either case, the necessary modifications could be prohibitively expensive.

Zero-sequence current shunt transformers typically act as current dividers, with the reduction of zero-sequence current being dependent on the ratio of the transformer zero-sequence impedance to the power system zero-sequence impedance. Such arrangements may filter out only about one-half of the zero-sequence neutral current, or less, which reduction may be insignificant relative to the system burden, and cost and complexity of the shunt transformer hardware.

Finally, passive and active filters can be difficult to implement and reliably operate, with difficult-to-predict behavior in practice. Such unpredictability can arise from transient ringing or resonant behavior at particular frequencies. With such filters, there are trade-offs between the filter's transient response and filter effectiveness. In addition, filters of this type typically have resistive components which consume real power.

There is a need, therefore, for a stable, active neutral current compensator which can nullify zero-sequence currents in the existing neutral line of a multi-phase power distribution system without consuming substantial amounts of real power to shunt fundamental and harmonic zero-sequence currents to ground.

SUMMARY OF THE INVENTION

The invention provides for an active neutral current compensator (ANCC) for controlling a zero-sequence current in a conductor of a multi-phase power distribution system. The ANCC consists of magnetic coupling means, which may be a multi-phase neutral-forming magnetic structure, for coupling the multi-phase power distribution system to the active neutral current compensator, a current sensing means, connected with the aforementioned conductor, for producing a control signal representative of the zero-sequence current in the conductor, and compensating means such as, for example, a feedback control system, which generates a nullificatory current flow, thereby forcing the zero-sequence current to be generally zero, in response to the current sensing means control signal.

In a first present preferred embodiment, the multi-phase, neutral-forming magnetic structure of the ANCC can be a three-phase neutral-forming autotransformer which is connected with the compensating means. The compensating means may consist of current sensing means for detecting a zero-sequence current and it is also preferred that the feedback control or compensating means include a cancelling means, which may be a controllable voltage source, preferably a single-phase linear or switching amplifier. In combination, the three-phase neutral-forming autotransformer connected with the single-phase inverter can compensate zero-sequence phase and neutral currents in multi-phase power distribution systems.

In other embodiments, it is preferred that the ANCC employs a multi-phase transformer as the multi-phase neutral-forming magnetic structure and utilizes a multi-phase transformer and compensator arrangement to compensate zero-sequence phase and neutral currents in multi-phase systems. It is preferred that the compensator have cancelling means, preferably a controllable voltage source and particularly a single-phase linear or switching amplifier, and that the compensator be regulated by a zero-sequence current controller which can continuously vary its output according to a sensed zero-sequence current on the source neutral line. The ANCC is connected with the zero-sequence current path of the electrical distribution system so that zero-sequence currents may be shunted to ground while the passage of positive- and negative-sequence currents to ground are blocked.

In a second present preferred embodiment, a grounded-wye/unloaded-delta transformer configuration is provided as the multi-phase, neutral-forming magnetic structure. In a third present preferred embodiment, a zig-zag auto-transformer can be provided as the multi-phase, neutral-forming magnetic structure. In each of these embodiments, it is also preferred to provide as the compensation means controllable voltage source, in particular, a single-phase linear or switchable amplifier, and more particularly, a single-phase inverter, and a zero-sequence current controller for regulation of transformer reactance. The inverter voltage is maintained so that the transformer reactance is approximately cancelled, thus allowing the net ANCC zero-sequence equivalent impedance to ground to be minimized, preferably to zero.

In one presently preferred method, zero-sequence phase and neutral currents, which may arise from the connection of non-linear loads to the power source, are sensed on a conductor of a multi-phase electrical distribution system by a zero-sequence current controller. The controller produces a control signal proportional to the sensed zero-sequence current. The controller can continuously adjust a voltage on an inverter which is connected with the zero-sequence current path of the distribution system so that a transformer reactance can be approximately cancelled, thus permitting zero-sequence currents to be shunted by a low impedance path to ground. Sensing of zero-sequence current may use the neutral line or at least one of the phase lines.

Other details, objects and advantages of the invention will become apparent as the following description of certain present preferred embodiments and certain present preferred methods proceeds.

DESCRIPTION OF THE PREFERRED EMBODIMENTS

Figure 1:
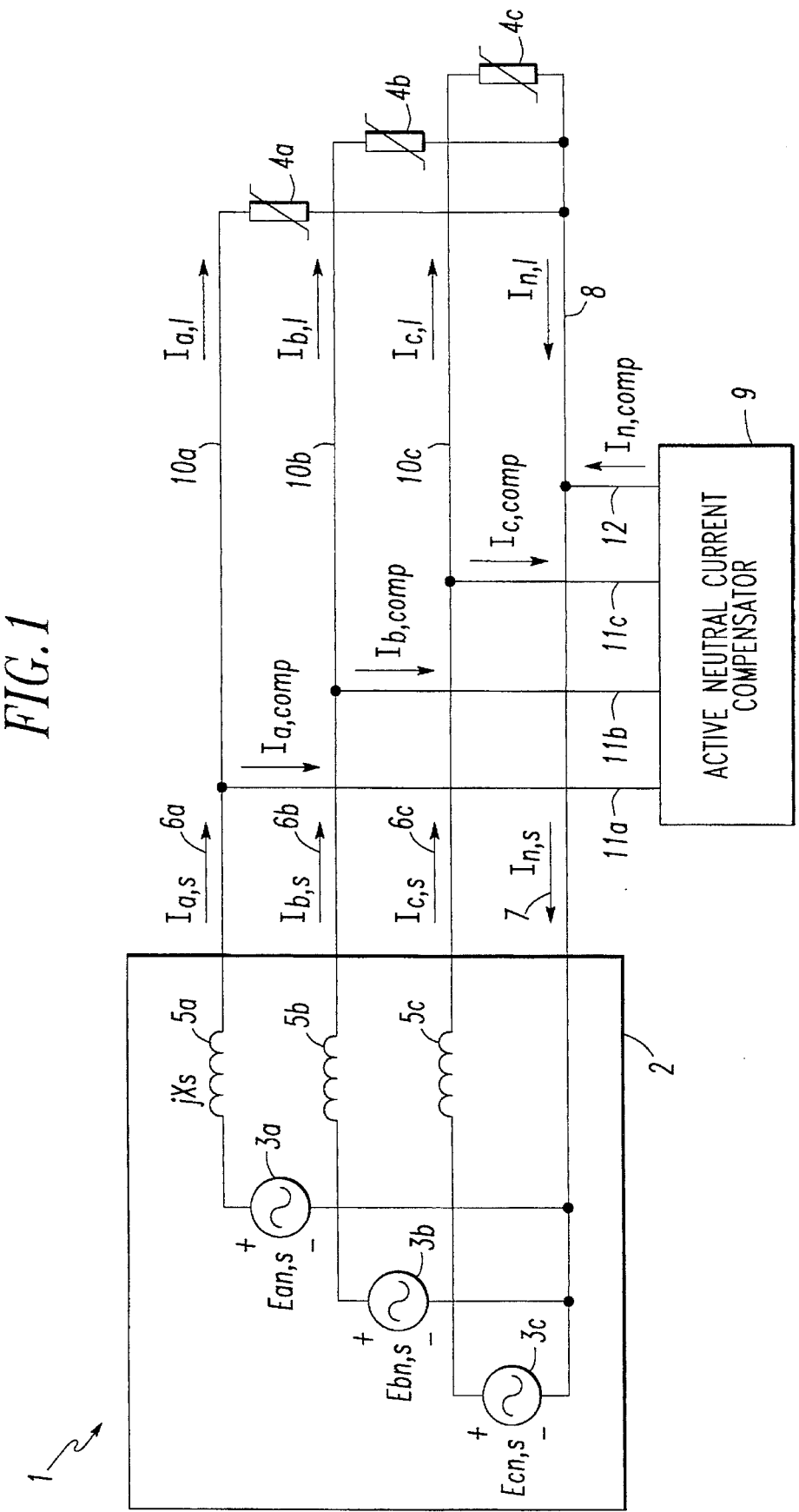
FIG. 1 is a diagram of an equivalent circuit of a three-phase, four-wire distribution system, using an ANCC according to the present invention, with line-to-neutral-connected non-linear loads.

The embodiments of the ANCC described herein are active power conditioners suited for mitigating undesired zero-sequence phase and neutral currents. In general, the ANCC consists of a magnetic coupling means, which may be a multi-phase neutral-forming magnetic structure, for coupling the multi-phase power distribution system to the active neutral current compensator, a current sensing means, connected with the aforementioned conductor, for producing a control signal representative of the zero-sequence current in a conductor of a multi-phase power distribution system, and a compensating means such as, for example, a feedback control system, which forces the zero-sequence current to be generally zero, in response to the current sensing means control signal.

In one embodiment, it is preferred that the multi-phase neutral-forming structure of the ANCC be a three-phase neutral-forming autotransformer which is connected with the compensating means. The compensating means receives an input signal from a current sensing means, which signal is representative of the zero-sequence currents. In such embodiments, it is also preferred that the feedback control or compensating means include a controllable voltage source, such as, for example, a single-phase inverter. In combination, the three-phase neutral-forming autotransformer connected with the single-phase controllable voltage source can compensate zero-sequence phase and neutral currents in multi-phase systems.

In other embodiments, it is preferred that the ANCC employs a multi-phase transformer as the multi-phase neutral-forming structure and utilizes a multi-phase transformer and feedback controller arrangement to compensate at least one of zero-sequence phase and zero-sequence neutral currents in multi-phase systems. It is preferred that the feedback controller have a controllable voltage source, particularly a single-phase linear or switching amplifier, more particularly a single-phase inverter, and be regulated by a zero-sequence current controller which can vary inverter output according to a sensed current on the conductor. The inverter output to the transformer can vary an apparent transformer reactance such that the net ANCC equivalent impedance is approximately zero. The ANCC employs a transformer configuration which acts as high impedance to positive- and negative-sequence excitation, but provides a low impedance shunt path to zero-sequence excitation. Although it is preferred to sense zero-sequence current on the neutral line, zero-sequence phase current, as sensed on at least one of the power distribution phase lines may be used as an input to the zero-sequence current controller.

The ANCC is an active power conditioner which utilizes a controllable voltage-source to implement a three-phase zero-sequence current filter. This compensator is capable of (1) eliminating neutral currents caused by load imbalance or non-linearity; (2) improving power factor by reducing phase current distortion; and (3) restoring partial balance to unbalanced loads. In the ideal case, the ANCC performs these functions without consuming real power. The ANCC can effect full or partial elimination of any or all zero sequence currents drawn from the source as desired by the user. This may include (1) eliminating unbalance currents at fundamental frequency while passing all zero sequence harmonics; (2) eliminating triplen harmonics (i.e., harmonics arising at multiples of the frequency such as 3, 9, 15, etc.) while permitting fundamental unbalance; or (3) eliminating substantially all zero-sequence source currents. The ANCC can also facilitate the arbitrary injection of zero-sequence currents at any frequency, as desired. Further, the ANCC can limit zero-sequence current, for example, by holding current RMS values below a preselected value.

In FIG. 1, an equivalent multi-phase circuit is illustrated for three-phase, four-wire power distribution system 1.

Power supply network 2, as represented by Thevenin-equivalent phase power sources 3a, 3b, 3c, feeds non-linear loads 4a, 4b, 4c. With each source 3a, 3b, 3c, may be associated source impedance 5a, 5b, and 5c. The phase-to-neutral voltage for sources 3a, 3b, and 3c may be symbolically represented by voltages Ean,s, Ebn,s, and Ecn,s, respectively. For balanced loads, impedances 5a, 5b, 5c, tend to be equal, and thus phase source currents 6a ($I_{a,s}$), 6b ($I_{b,s}$), and 6c ($I_{c,s}$) can differ in phase by 120°, but have equal magnitudes.

However, with unbalanced loading, the instantaneous sum of phase currents 6a, 6b, 6c in system 1 is non-zero, and zero-sequence neutral current ($I_{n,s}$) 7 flows in neutral conductor 8. This can be seen by the relationship:

$$\vec{I}_{a,s} + \vec{I}_{b,s} + \vec{I}_{c,s} = \vec{I}_{n,s} \neq 0 \qquad \text{(EQUATION 1)}$$

Therefore, as non-linear loads are joined to system 1, zero-sequence neutral current 7 can begin to flow between loads 4a, 4b 4c, and power supply 2. Each of the phase currents 6a, 6b, 6c contribute a zero-sequence phase current to zero-sequence neutral current 7 according to the relationship:

$$\vec{I}_{a,\phi} = \vec{I}_{b,\phi} = \vec{I}_{c,\phi} = \frac{\vec{I}_{n,s}}{3} = \frac{\vec{I}_{a,s} + \vec{I}_{b,s} + \vec{I}_{c,s}}{3} \qquad \text{(EQUATION 2)}$$

To reduce the effect of zero-sequence current 7 in the neutral conductor, ANCC 9 can be connected between distribution conductors 10a, 10b, and 10c, and neutral conductor 8 by ANCC phase conductors 11a, 11b, 11c, and ANCC neutral conductor 12, respectively. Thus, ANCC 9 can eliminate both phase and neutral zero-sequence currents.

Figure 2:
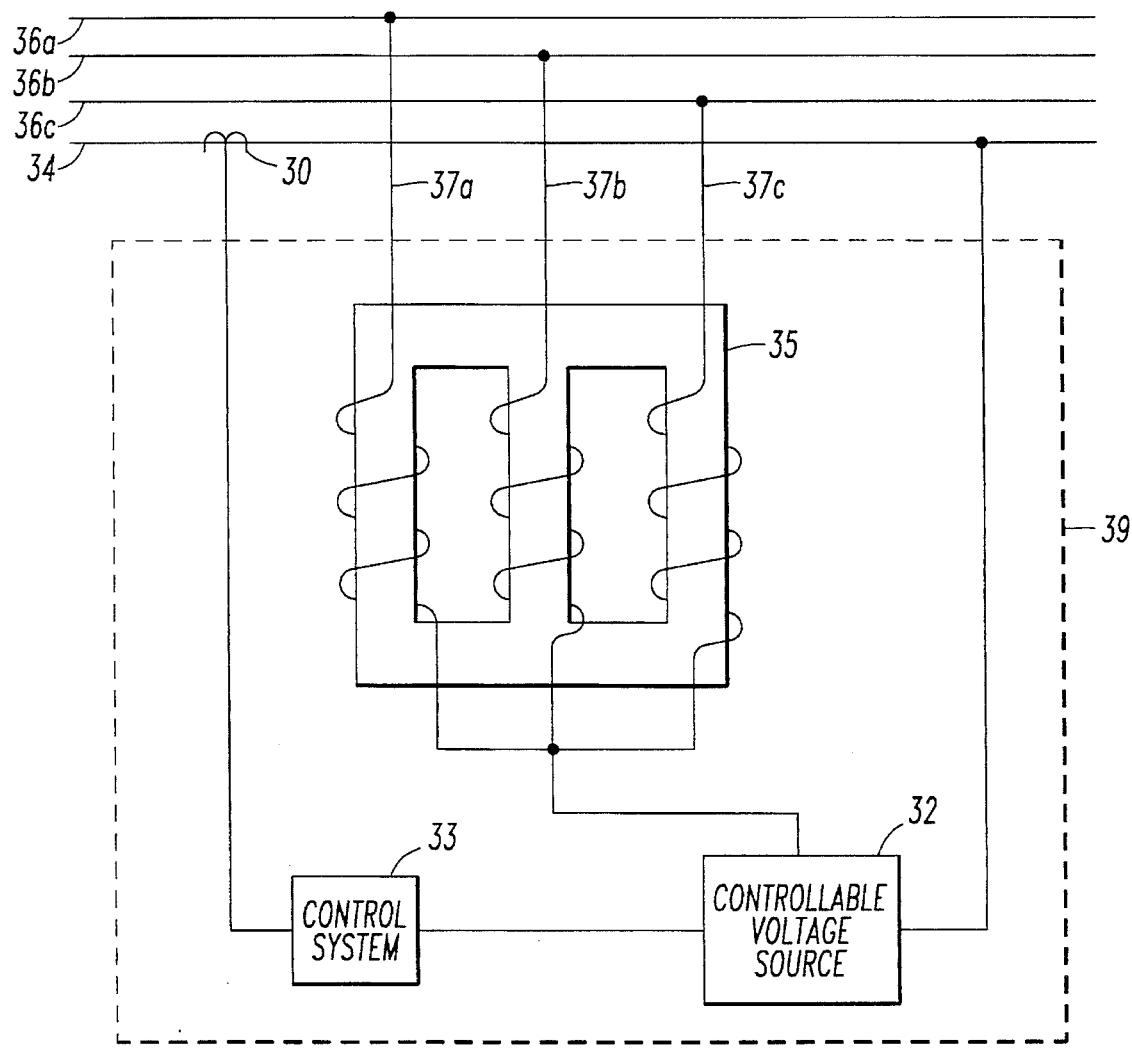
FIG. 2 is a diagram of an ANCC derived from a three-phase neutral-forming autotransformer.

In a first presently preferred embodiment according to the present invention, as shown in FIG. 2, it is preferred to employ a three-phase neutral-forming auto-transformer 35 as the multi-phase neutral-forming magnetic structure. In this embodiment, it is preferred to connect ANCC 39 to three-phase distribution conductors 36a, 36b, 36c, by ANCC phase conductors 37a, 37b, 37c. It also is preferred to connect a controllable voltage source such as, for example, single-phase inverter 32 in series with the zero sequence current flow path of three-phase neutral-forming autotransformer 35 so that inverter 32 receives the summed zero-sequence phase currents from conductors 36a, 36b, 36c. The voltage of inverter 32 is then varied to cancel the zero-sequence current in neutral conductor 34. In response to the sensed zero-sequence current as detected by current sensing means 30, sensing means 38 drives a signal in controller 33 which provides control over inverter 32.

Fundamental and harmonic zero-sequence currents drawn by loads on distribution conductors 36a, 36b, 36c, which are electrically "downstream" from ANCC 39, may be shunted through the artificially-induced short-circuit and thus may be prevented from propagating further "upstream" toward the power supplies. Because ANCC 39 acts as a high impedance to positive- and negative-sequence excitation, it may not substantially affect positive- and negative-sequence fundamental and harmonic load currents.

Figure 3:
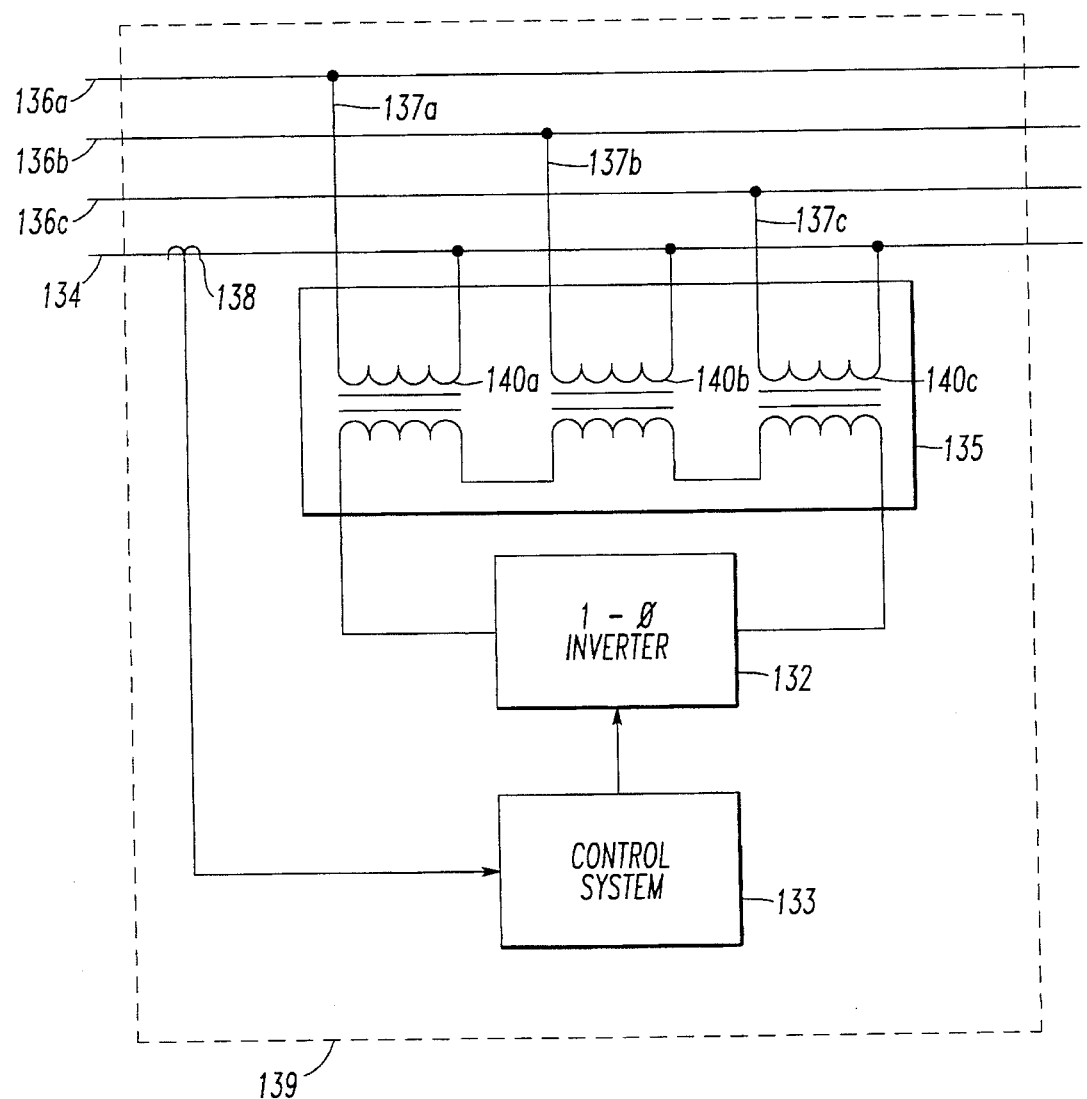
FIG. 3 is a diagram of an ANCC derived from a grounded-wye/unloaded-DELTA three-phase transformer.

In a second presently preferred embodiment according to the present invention, as shown in FIG. 3, it is preferred to employ a grounded-wye/unloaded-delta transformer 135 as the multi-phase, neutral-forming magnetic structure. In this embodiment, ANCC 139 is connected to three-phase distribution conductors 136a, 136b, 136c, by ANCC phase conductors 137a, 137b, 137c. It is preferred to control the operation of transformer 135 with a control means, which control means may consist of a controllable voltage source such as, for example, inverter 132 and zero-sequence current controller 133. It also is preferred to connect single-phase inverter 132 in series with the zero-sequence current flow path on the unloaded-delta side of transformer 135. The voltage of inverter 132 is then varied to cancel the equivalent impedance of transformer windings 140a, 140b, 140c, ideally creating a zero impedance shunt path for zero-sequence currents. The value of the equivalent impedance of transformer windings 140a, 140b, 140c, needed to create the zero impedance shunt path, can be determined by controller 133 which determines the magnitude of the current flowing through neutral conductor 134, using neutral current sensing means 138.

Although it is preferred that at least one current sensing means 138 be connected to neutral conductor 134, other preferred embodiments can provide for at least one current sensing means 138 on selected ones of distribution conductors 137a, 137b, and 137c to sense the zero-sequence phase current. Also, it is presently preferred to sense the zero-sequence current flowing between ANCC 139 and the power supply. However, current sensing means 138, which can include an open-loop control system, may also be used to sense zero-sequence current between ANCC 139 and the load.

Fundamental and harmonic zero-sequence currents drawn by loads on distribution conductors 136a, 136b, 136c, which are electrically "downstream" from ANCC 139, are shunted through the artificially-induced short-circuit and thus prevented from propagating further "upstream" toward the power supplies. Because ANCC 139 acts as a high impedance to positive- and negative-sequence excitation, it may not substantially affect positive- and negative-sequence fundamental and harmonic load currents.

Figure 4:
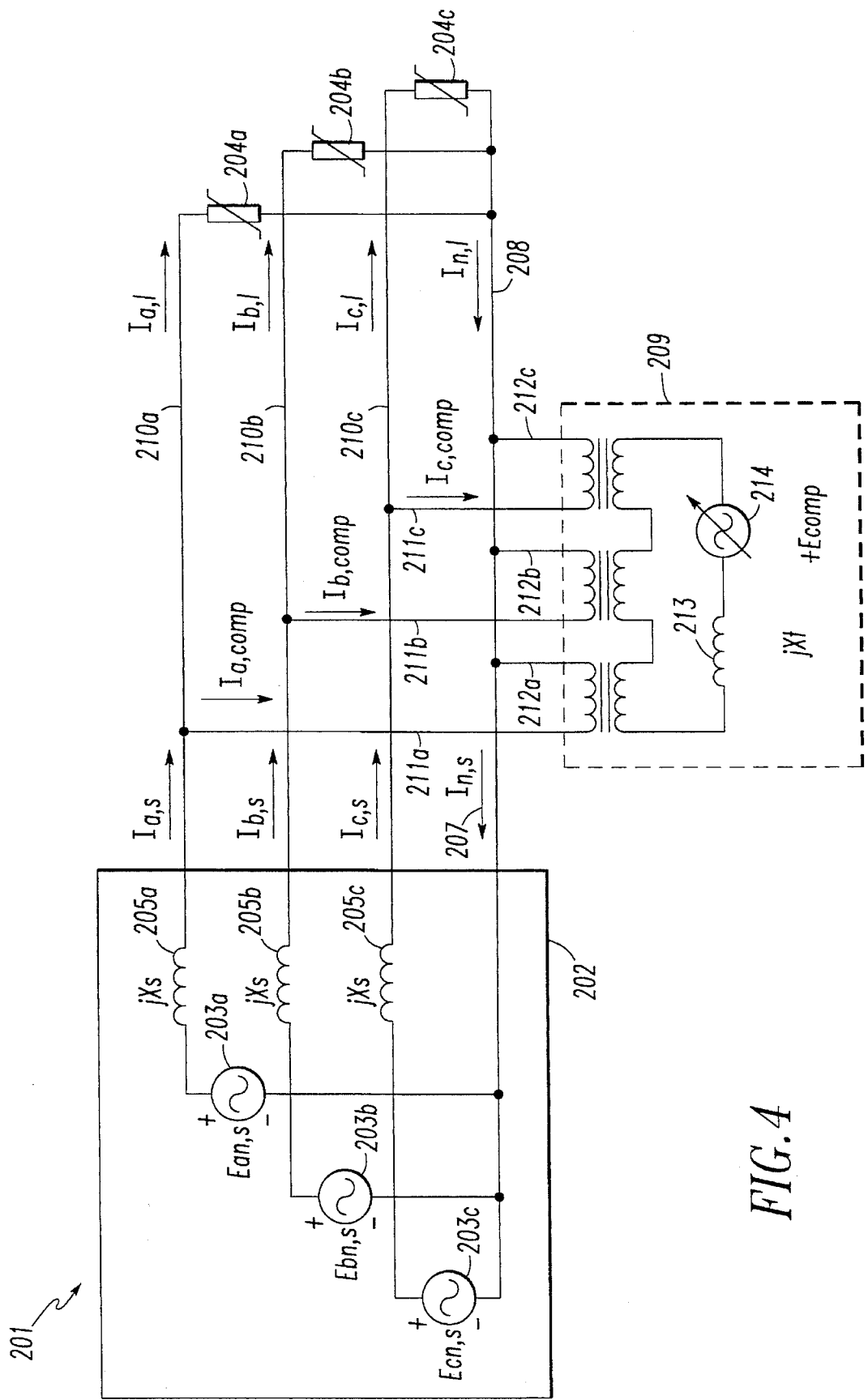
FIG. 4 is a diagram of an equivalent circuit of a three-phase, four-wire distribution system, using a grounded-wye/unloaded-delta transformer-basedANCC according to the present invention, with line-to-neutral-connected non-linear loads.

The grounded wye/unloaded delta-based ANCC 139 of FIG. 3 is implemented in the three-phase, four-wire equivalent distribution system 201 shown in FIG. 4. Similar to distribution system 1 shown in FIG. 1, power supply network 202, as represented by Thevenin-equivalent phase power sources 203a, 203b, 203c, feeds non-linear loads 204a, 204b, 204c. With each source 203a, 203b, 203c, may be associated source impedance 205a, 205b, and 205c.

Also as in FIG. 1, phase-to-neutral voltages for sources 203a, 203b, and 203c may be symbolically represented in FIG. 4 by voltages Ean,s, Ebn,s, and Ecn,s, respectively. To reduce the effect of zero-sequence current 207 in the neutral conductor, grounded wye/unloaded delta ANCC 209 can be connected between line distribution conductors 210a, 210b, and 210c, and neutral conductor 208, by ANCC phase conductors 211a, 211b, 211c, and ANCC neutral conductors 212a, 212b, 212c, respectively. Equivalent compensation source 214 provides the voltage necessary to compensate transformer equivalent impedance 213 so that zerosequence currents may be shunted and diverted from neutral conductor 208.

Figure 5:
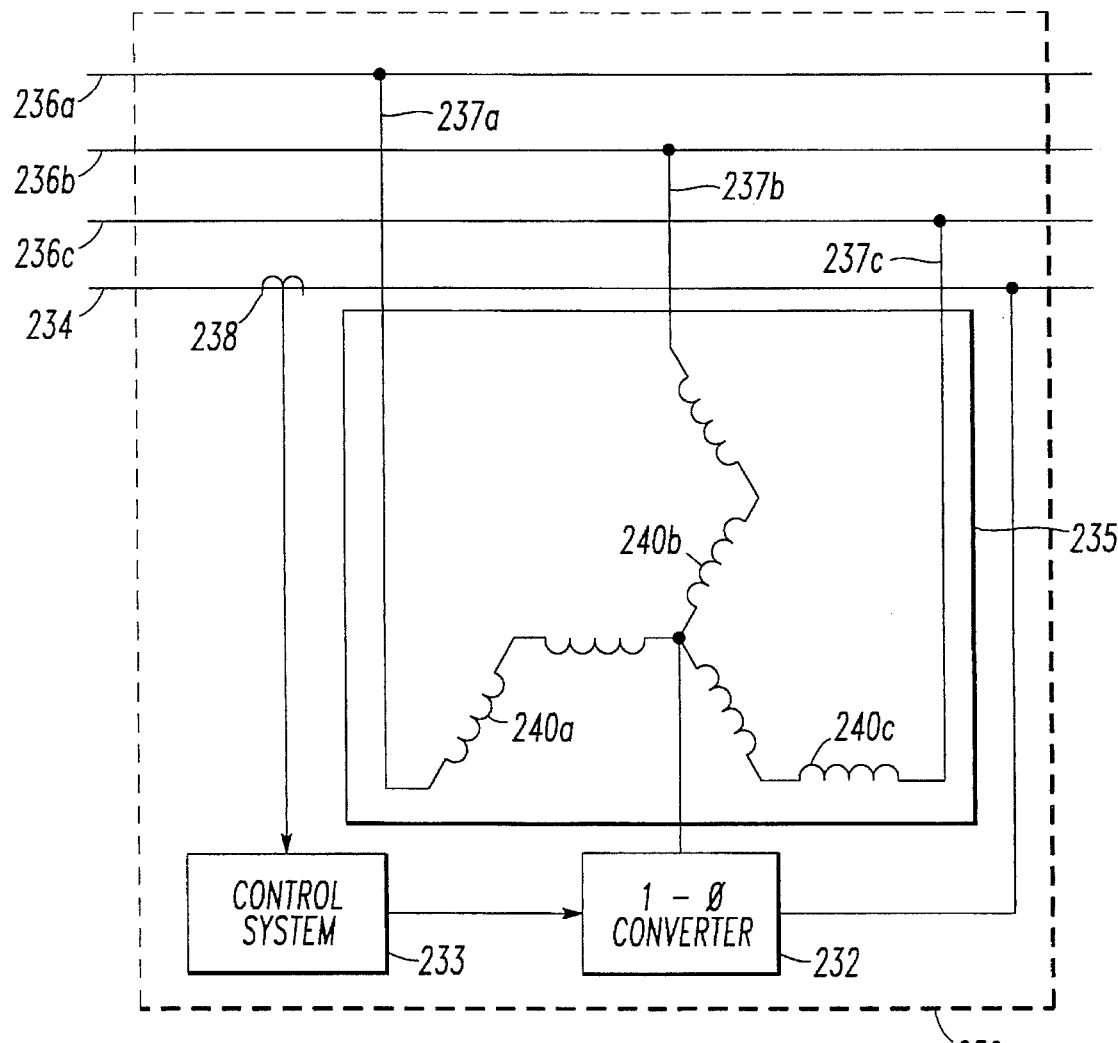
FIG. 5 is a diagram of an ANCC derived from a zig-zag auto-transformer.

In a second presently preferred embodiment according to the present invention, as shown in FIG. 5, it is preferred to employ a zig-zag auto-transformer 235. In this embodiment, ANCC 239 is connected to three-phase distribution conductors 236a, 236b, 236c, by ANCC phase conductors 237a, 237b, 237c. Similar to FIG. 3, it is preferred to control the operation of transformer 235 with a control means, which control means may consist of inverter 232 and zero-sequence current controller 233. It also is preferred to connect controllable voltage source, such as, for example, single-phase inverter 232 in series with the zero-sequence current flow path on neutral-to-neutral connection 241 between neutral conductor 234 and auto-transformer 235. The voltage of inverter 232 then may be varied to cancel the equivalent impedance of transformer windings 240a, 240b, 240c, ideally creating a zero impedance shunt path for zero-sequence circuits. The value of the equivalent impedance of secondary transformer windings 240a, 240b, 240c needed to create the zero impedance shunt path can be determined by control means 233, which determines the magnitude of the current flowing through neutral conductor 234 using neutral current sensing means 238. Fundamental and harmonic zero-sequence currents drawn by loads on distribution conductors 236a, 236b, 236c, which are electrically "downstream" from ANCC 239, are shunted through the artificially-induced short circuit and thus prevented from propagating further "upstream" toward the power supplies. Because ANCC 239 acts as a high impedance to positive- and negative-sequence excitation, it may not substantially affect positive- and negative-sequence fundamental and harmonic load currents.

Figure 6:
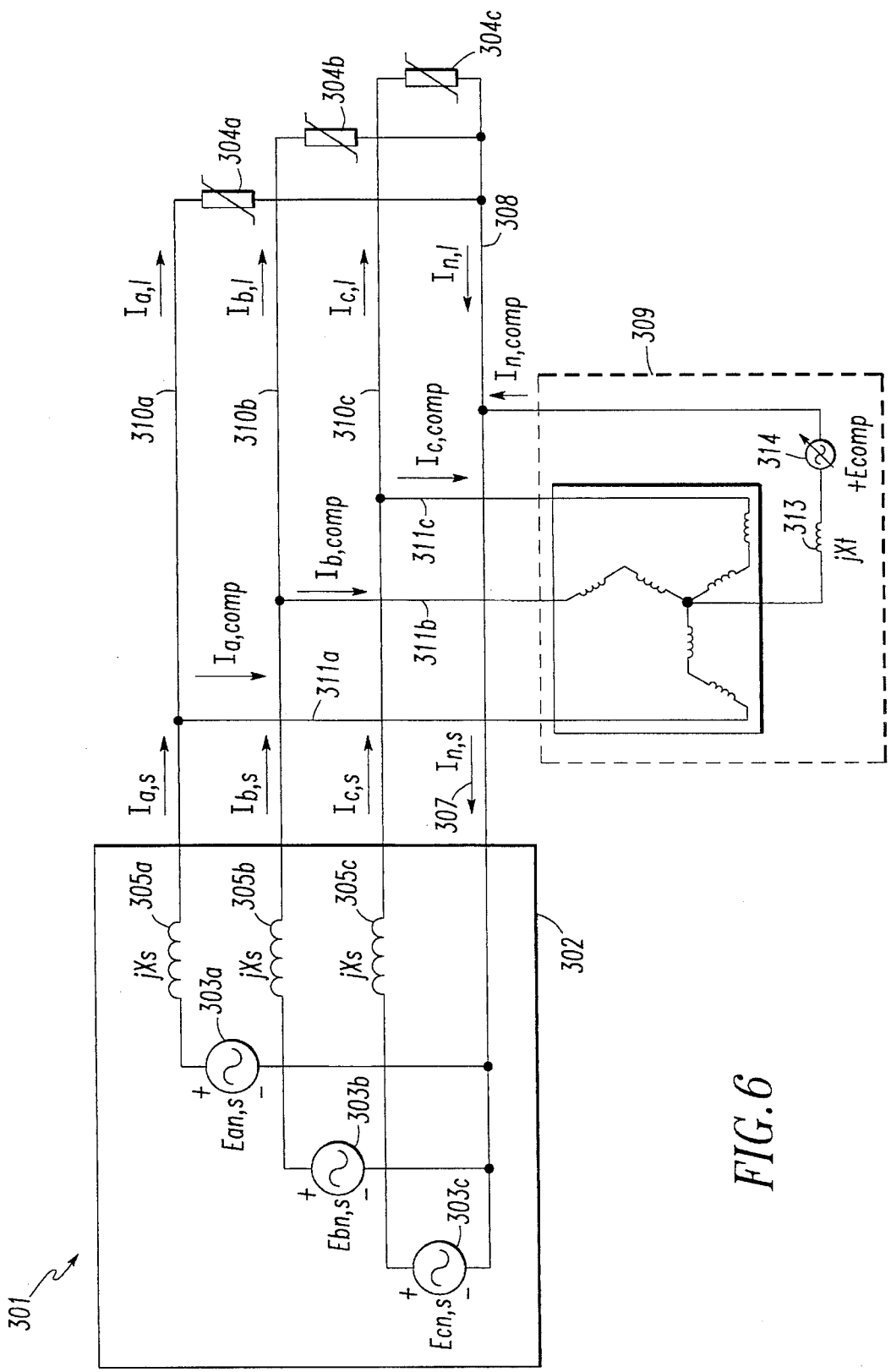
FIG. 6 is a diagram of an equivalent circuit of a three-phase, four-wire distribution system, using a zig-zag auto-transformer-based ANCC according to the present invention, with line-to-neutral-connected non-linear loads.

The zig-zag auto-transformer-based ANCC 239 of FIG. 5 is implemented in the three-phase, four-wire equivalent distribution system 301 shown in FIG. 6. Similar to distribution system 1 shown in FIG. 1 and to system 202 in FIG. 4, power supply network 302, as represented by Thevenin-equivalent phase power sources 303a, 303b, 303c, feeds non-linear loads 304a, 304b, 304c. With each source 303a, 303b, 303c, may be associated source impedance 305a, 305b, and 305c. Also as in FIGS. 1 and 4, phase-to-neutral voltages for sources 303a, 303b, and 303c may be symbolically represented by voltages Ean,s, Ebn,s, and Ecn,s, respectively. To reduce the effect of zero-sequence current 307 in neutral conductor 308, zig-zag auto-transformer-based ANCC 309 can be connected between line distribution conductors 310a, 310b, and 310c, and neutral conductor 308, by ANCC phase conductors 311a, 311b, 311c, and ANCC neutral conductor 312, respectively. Equivalent compensation source 314 provides the voltage necessary to compensate transformer equivalent impedance 313 so that zero-sequence currents may be shunted and diverted from neutral conductor 308.

Figure 7:
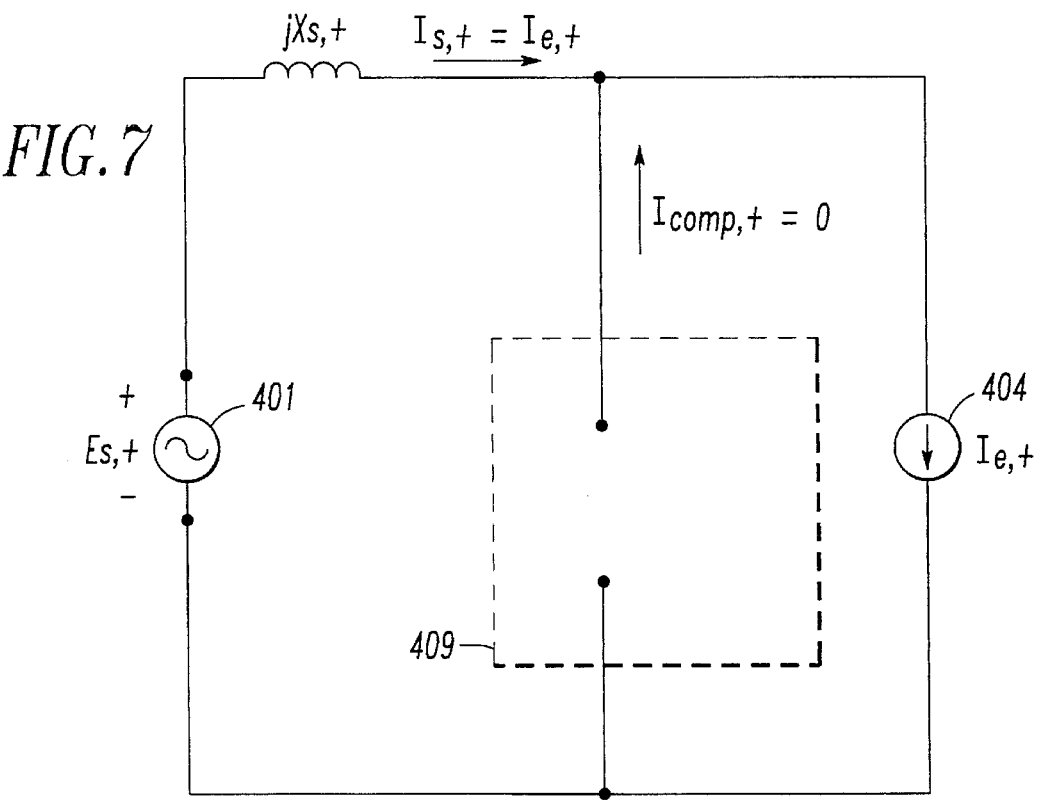
FIG. 7 is a diagram of a positive-sequence equivalent network employing an ANCC according to present invention in response to 60 Hz sinusoids.

FIG. 7 is a positive-sequence equivalent network modeled after equivalent networks such as those shown in FIGS. 1, 4 and 6. For simplicity, the power supply network voltage 401 is chosen to be positive-sequence, 60 Hz sinusoids; also, the non-linear loads are modeled as current sink 404. Because of the sequence properties of ANCC 409, its equivalent positive-sequence impedance is $Z_{ANCC,+} \rightarrow \infty$ The shunt path of ANCC 409 acts as an open circuit to positive-sequence excitation. Therefore, it has no substantial effect on fundamental or harmonic positive-sequence currents drawn by the non-linear loads.

Figure 8:
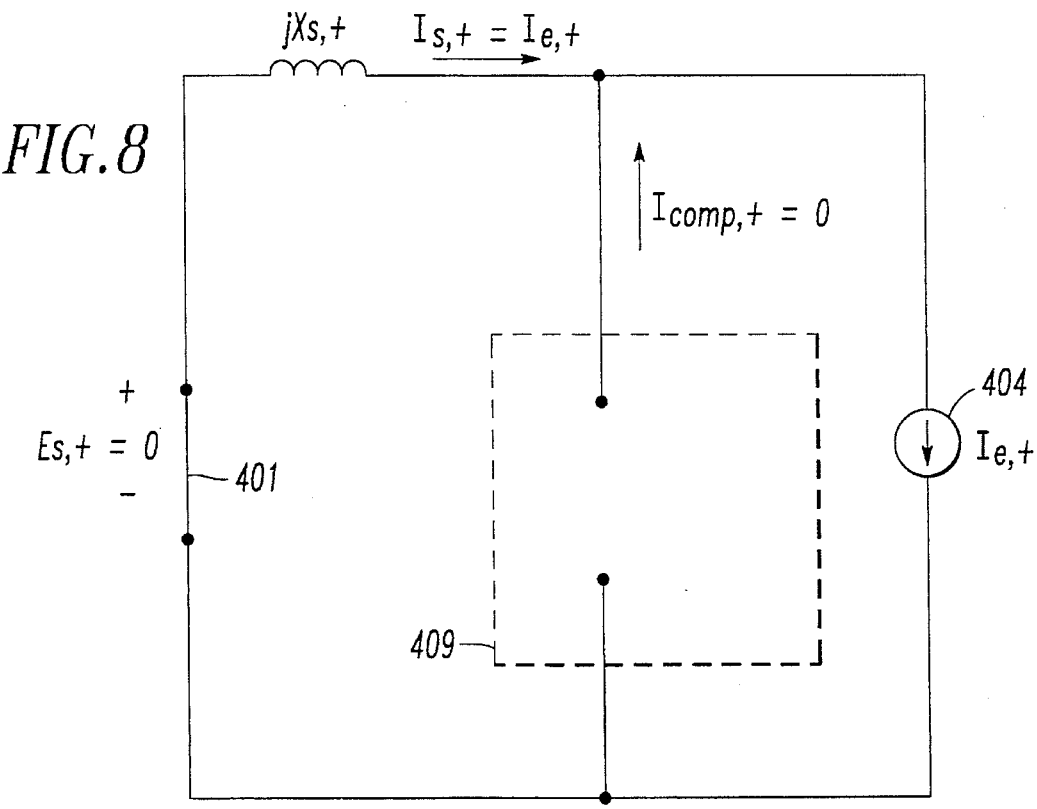
FIG. 8 is a diagram of a positive-sequence equivalent network employing an ANCC according to the present invention in response to harmonic sinusoids.
Figure 9:
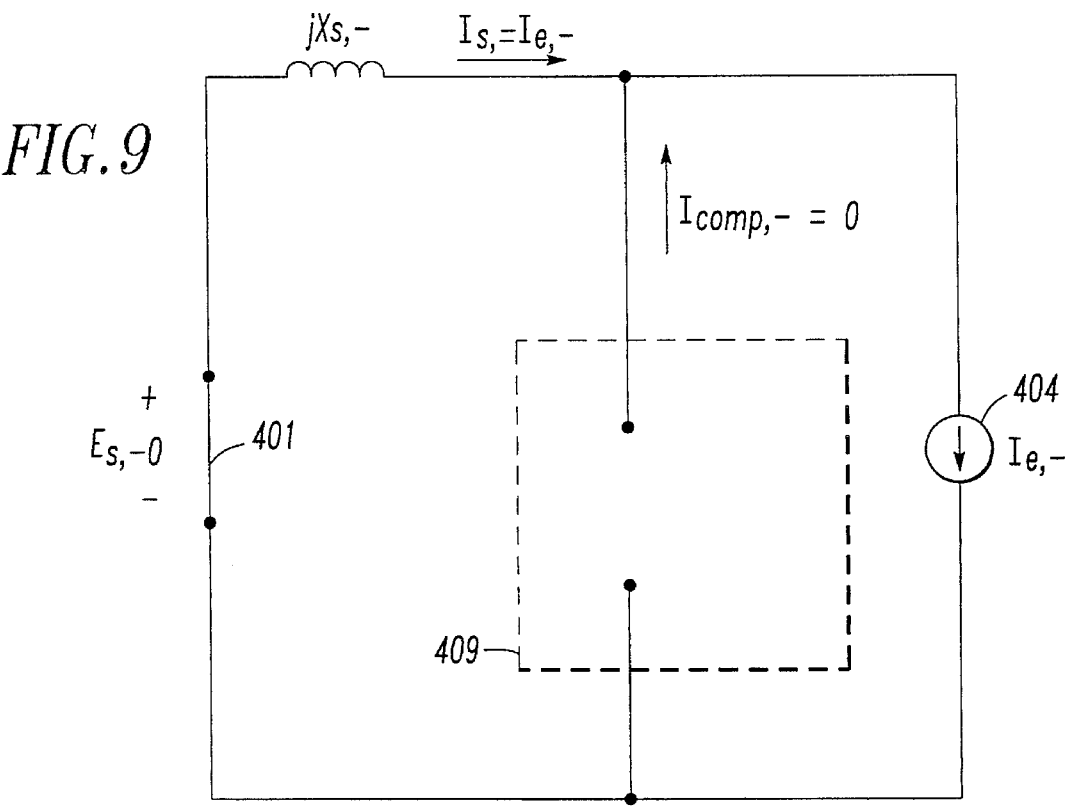
FIG. 9 is a diagram of a negative-sequence equivalent network employing an ANCC according to the present invention in response to 60 Hz sinusoids.

FIG. 8 also is a positive-sequence equivalent network based on the symmetrical component equivalent network shown in FIG. 7 but, unlike FIG. 7, illustrates the response of ANCC 409 to harmonic (f≠60 Hz) positive-sequence currents drawn by the linear loads. Because ANCC 409 behaves in a linear fashion, the ANCC negative-sequence impedance, as modeled in FIG. 9, is equal to its positive-sequence impedance:

$Z_{ANCC,-} \rightarrow \infty$

The shunt path of ANCC 409 acts as an open circuit to negative-sequence excitation. Consequently, it has no significant influence negative-sequence fundamental or harmonic currents drawn by the non-linear loads.

Figure 10:
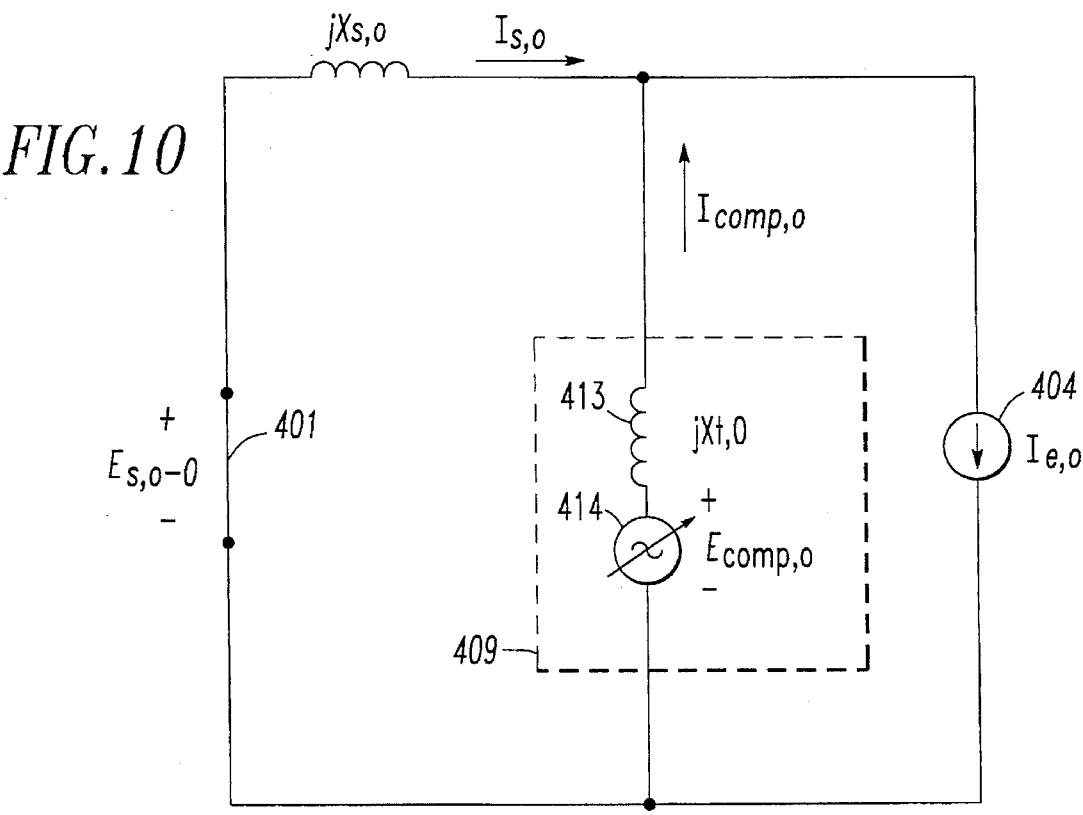
FIG. 10 is a diagram of a zero-sequence equivalent network employing an ANCC according to the present invention.

FIG. 10 illustrates a zero-sequence equivalent network for ANCC 409 by a variable voltage source 414 in series with the equivalent leakage reactance 413 of the transformer connection. By solving Kirchoff's voltage equation for the left-hand loop of the circuit in FIG. 9, the following relation for the zero-sequence source current can be determined:

$$I_{s,0} = \left[ \frac{X_{t,0}}{X_{s,0}+X_{t,0}} \right] I_{l,0} - j \left[ \frac{1}{X_{s,0}+X_{t,0}} \right] E_{comp,0} \quad \text{(EQUATION 3)}$$

The inverter voltage can be continuously controlled so that the following relationship is always maintained:

EQUATION 4

$E_{comp,0} = -j\, X_{t,0} I_{l,0}$

If equation 3 is substituted into equation 4, and solved for the zero-sequence source and compensator currents, the following results are obtained:

EQUATION 5

$I_{s,0} = 0$

EQUATION 6

$I_{comp,0} = I_{l,0}$

Using equations 4 and 6, the equivalent zero-sequence impedance of the ANCC may be calculated:

$$\begin{aligned} Z_{ANCC,0} &= \left[ \frac{E_{comp,0}}{I_{comp,0}} \right] + jX_{t,0} \quad \text{(EQUATION 7)} \\ &= \left[ \frac{-jX_{t,0}I_{l,0}}{I_{l,0}} \right] + jX_{t,0} \\ &= -jX_{t,0} + jX_{t,0} \\ &= 0 \end{aligned}$$

When the inverter voltage is maintained as given in equation 4, the apparent transformer reactance is cancelled so that the net ANCC zero-sequence equivalent impedance is zero. The real power consumed by an ideal ANCC may also be calculated from equations 4 and 6:

$$\begin{aligned} P_{ANCC} &= 3(P_+ + P_- + P_0) \quad \text{(EQUATION 8)} \\ &= 3(0 + 0 + P_0) \\ &= 3|E_{comp,0}| |I_{comp,0}| \sin(\theta_v - \theta_i) \\ &= 3|X_{t,0}I_{l,0}| |I_{l,0}| \sin(90° \text{ leading}) \\ &= 0\, W \end{aligned}$$

In the ideal case, therefore, the ANCC consumes no real power. Therefore, the compensating action of the ANCC may be purely reactive in nature. In a distribution system that is supplying three-phase power to a four-wire, nonlinear load connected in parallel with an ANCC, the ANCC provides an artificially-induced low-impedance path which shunts zero-sequence currents demanded by loads "downstream" from the ANCC. The zero-sequence currents circulate between the load and the ANCC, and thus are prevented from propagating further "upstream".

Figure 11A:
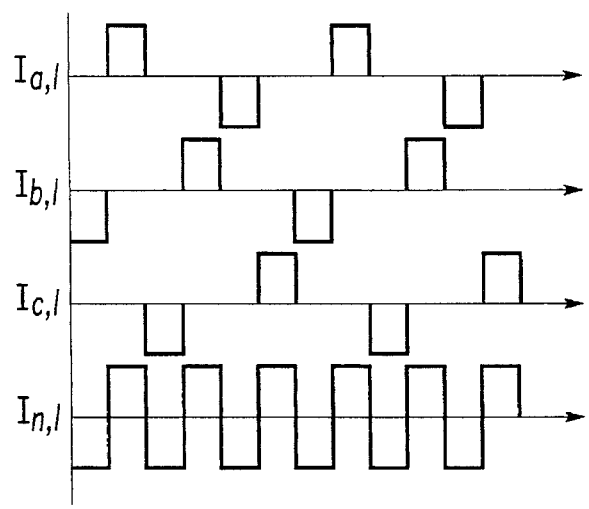
FIG. 11a is an illustration of three-phase nonlinear load current, and resultant neutral line current.
Figure 11B:
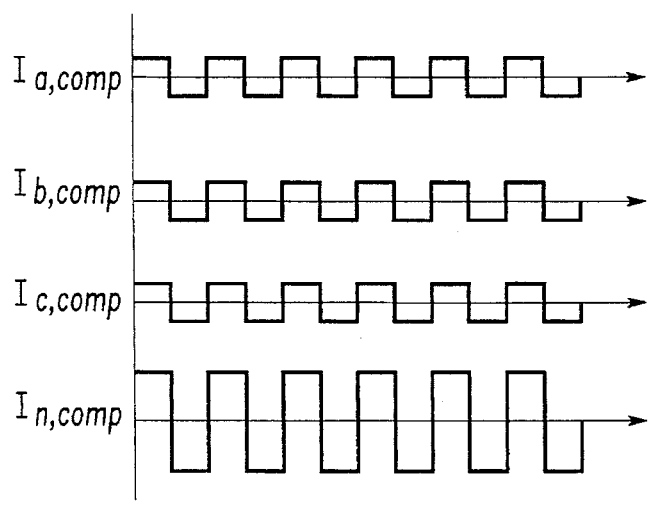
FIG. 11b is an illustration of phase and neutral current components which are supplied by the ANCC.
Figure 11C:
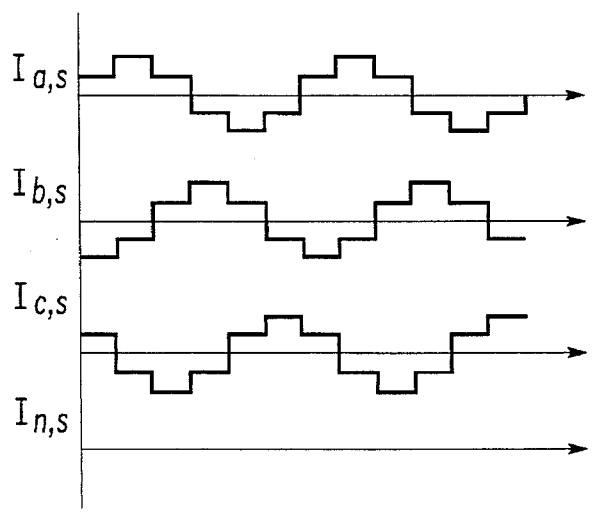
FIG. 11c is an illustration of three-phase source currents, and resultant neutral current which arises from ANCC operation.

FIG. 11a illustrates two cycles of phase and neutral currents drawn by a four-wire load consisting of a three-phase set of line-to-neutral-connected non-linear impedances. Note that the phase currents add constructively in the neutral conductor. FIG. 11b depicts the zero-sequence components of the phase and neutral load currents, which are shunted through the ANCC. FIG. 11c represents the current drawn from the source by the parallel combination of the ANCC and the non-linear load. Two results of ANCC compensation are apparent from FIGS. 11a, 11b and 11c. First, the load neutral current is complemented, and thus cancelled, by the ANCC so that no neutral current is returned to the source. Second, the ANCC improves the aggregate distortion power factor of the load by reducing the total harmonic distortion of the phase currents. Table 1 provides a quantitative summary of ANCC performance. In addition to the foregoing, the ANCC tends to partially balance unbalanced loads by eliminating zero-sequence phase currents.

In one presently preferred method, zero-sequence phase and zero-sequence neutral currents, which may arise from the connection of non-linear loads to the power source, are sensed on at least one conductor of a multi-phase electrical distribution system. The apparent impedance in a zero-sequence current path of such multiple phase electrical distribution system is controlled responsive to the zero-sequence current sensed in the conductor so that at least one of zero-sequence phase and zero-sequence neutral currents are shunted to groun.d. The method may further include controlling an controllable voltage source, such as, for example, to produce a voltage proportional to and representative of a preselected equivalent zero-sequence impedance, and adjusting the voltage so that a transformer reactance proportional to at least one of zero-sequence phase and zero-sequence neutral currents is approximately cancelled, thus permitting zero-sequence currents to be shunted by a low impedance path to ground. Although sensing zero-sequence neutral current on the neutral line or conductor is presently preferred, sensing a zero-sequence phase current in at least one phase line of such multiple phase electrical distribution system may also be used to practice the method herein.

While specific embodiments of the invention have been illustrated, and methods of practicing the invention have been described, it will be appreciated by those skilled in the art that various modifications and alternatives to those details could be developed in light of the overall teachings of the disclosure. Accordingly, it is understood that the invention is not limited thereto but may be otherwise variously embodied and practiced within the scope of the following claims.

TABLE 1

Quantitative Summary of ANCC Performance

| | | |
|---|---|---|
| Load without compensation FIG. 11 (a) | Power Factor = 0.77 | $I_{neutral} = 1.73\ I_{phase}$ |
| Load compensated by ANCC FIG. 11 (c) | Power Factor = 0.95 | $I_{neutral} = 0$ |

I claim:

1. An active neutral current compensator for controlling a zero-sequence current in at least one conductor of a multi-phase power distribution system comprising:

a. a multi-phase neutral-forming magnetic structure connected to said multi-phase distribution system for supplying electric power to said active neutral current compensator;

b. said multi-phase neutral-forming magnetic structure having at least one zero-sequence current path;

c. said multi-phase neutral-forming magnetic structure providing low impedance to said zero-sequence current and high impedance to a positive-sequence current and high impedance to a negative-sequence current in at least one conductor of said multi-phase power distribution system:

d. current sensing means, operably connected with said at least one conductor, for sensing a zero-sequence current in said at least one conductor; and e. control means, connected to said current sensing means and said at least one conductor, for controlling a zero-sequence equivalent impedance in said multi-phase neutral-forming magnetic structure in response to said zero-sequence current in said at least one conductor.

2. The active neutral current compensator of claim 1 wherein said at least one conductor is a neutral line of such multi-phase power distribution system.

3. The active neutral current compensator of claim 1 wherein said at least one conductor is at least one of the phase lines of such multi-phase power distribution system.

4. An active neutral current compensator for controlling a zero-sequence current in at least one conductor of a multi-phase power distribution system comprising:

a. a multi-phase neutral-forming magnetic structure connected to said multi-phase distribution system for supplying electric power to said active neutral current compensator:

b. said multi-phase neutral-forming magnetic structure having at least one zero-sequence current path:

c. current sensing means, operably connected with said least one conductor, for sensing a zero-sequence current in said at least one conductor;

d. control means, connected to said current sensing means and said at least one conductor, for controlling a zero-sequence equivalent impedance in said multi-phase neutral-forming magnetic structure in response to said zero-sequence current in said at least one conductor; and e. wherein said multi-phase neutral-forming magnetic structure comprises:
   a multi-phase transformer connected to such multi-phase power distribution for supplying electric power to said active neutral current compensator;
   said multi-phase transformer having at least one primary winding circuit, said at least one primary winding circuit being connected to a respective phase of such multi-phase power distribution system; and
   said multi-phase transformer having at least one secondary winding circuit, said at least one secondary winding circuit being magnetically coupled with respective one of at least one primary winding circuit, said secondary winding circuit being serially connected with a zero-sequence current path of said multi-phase transformer, said zero-sequence current path being operably connected with said at least one conductor.

5. The active neutral current compensator of claim 1 wherein said multi-phase neutral-forming magnetic structure comprises a three-phase neutral-forming autotransformer.

6. The active neutral current compensator of claim 4 wherein said multi-phase transformer is a grounded-wye/ unloaded-delta transformer, said at least one primary winding circuit being connected in a grounded-wye configuration, and said at least one secondary winding circuit being connected in an unloaded-delta configuration wherein said at least one secondary winding circuit is connected in series with said control means.

7. The active neutral current compensator of claim 4 wherein said multi-phase transformer is a zig-zag transformer and said control means is connected in series between the neutral line of said zig-zag transformer and the neutral line of such multi-phase power distribution system.

8. The active neutral current compensator of claim 5 wherein said control means further comprises:
   a. an controllable voltage source electrically connected in series with said zero-sequence current path, said controllable voltage source for p-roviding a current flow nullificatory to the zero-sequence current in said at least one conductor in such power distribution system; and
   b. a zero-sequence current controller having at least one controllable voltage source connection to said zero-sequence current path and at least one current sensing means connection to said at least one conductor so that said controllable voltage source may receive a control signal responsive to such zero-sequence current imposed on said at least one conductor.

9. The active neutral current compensator of claim 8 wherein said controllable voltage source comprises a single-phase inverter.

10. The active neutral current compensator of claim 6 wherein said control means further comprises:
   a. a controllable voltage source electrically connected in series with said zero-sequence current path, said controllable voltage source for providing a current flow nullificatory to the zero-sequence current in said at least one conductor in such power distribution system; and
   b. a zero-sequence current controller having at least one controllable voltage source connection to said zero-sequence current path and at least one current sensing means connection to said at least one conductor so that said controllable voltage source may receive a control signal responsive to such zero-sequence current imposed on said at least one conductor.

11. The active neutral current compensator of claim 7 wherein said control means further comprises:
   a. a controllable voltage source electrically connected in series with said zero-sequence current path, said controllable voltage source for providing a current flow nullificatory to the zero-sequence current in said at least one conductor in such power distribution system; and
   b. a zero-sequence current controller having at least one controllable voltage source connection to said zero-sequence current path and at least one current sensing means connection to said at least one conductor so that said controllable voltage source may receive a control signal responsive to such zero-sequence current imposed on said at least one conductor.

12. The active neutral current compensator of claim 8 wherein:
   said zero-sequence current controller produces a control signal responsive to said zero-sequence current imposed on said at least one conductor, and
   said controllable voltage source regulates a reactance of said multi-phase neutral-forming auto-transformer so that a net active neutral current compensator zero-sequence equivalent impedance is generally zero.

13. The active neutral current compensator of claim 10 wherein:
   said zero-seqUence current controller produces a control signal responsive to said zero-sequence current imposed on said at least one conductor, and
   said controllable voltage source regulates a reactance of said multi-phase transformer so that a net active neutral current compensator zero-sequence equivalent impedance is generally zero.

14. The active neutral current compensator of claim 11 wherein:
   said zero-sequence current controller produces a control signal responsive to said zero-sequence current imposed on said at least one conductor, and
   said controllable voltage source regulates a reactance of said multi-phase transformer so that a net active neutral current compensator zero-sequence equivalent impedance is generally zero.

15. An active neutral current compensator for controlling a zero-sequence current in at least one conductor of a multi-phase power distribution system comprising:
   a. magnetic coupling means, connected to said multi-phase power distribution system for coupling said multi-phase power distribution system to said active neutral current compensator;
   b. said magnetic coupling means providing low impedance to said zero-sequence current and high impedance to a positive-sequence current and high impedance to a negative-sequence current in at least one conductor of said multi-phase power distribution system;
   c. current sensing means, connected with said at least one conductor, for producing a control signal representative of said zero-sequence current; and
   d. compensating means, connected between said magnetic coupling means and said at least one conductor and connected to said sensing means, for forcing said zero-sequence current to be generally zero, said compensating means being responsive to said control signal of said sensing means.

16. The active neutral current compensator of claim 15 wherein
   said low impedance is generally zero and said high impedance is generally infinite, and
   said compensating means includes cancelling means for reducing said zero-sequence impedance of said magnetic coupling means.

17. The active neutral current compensator of claim 16 wherein said cancelling means comprises a single-phase inverter.

18. The active neutral current compensator of claim 15 wherein said at least one conductor is the neutral line of such multi-phase power distribution system.

19. The active neutral current compensator of claim 15 wherein said at least one conductor is at least one of the phase lines of such multi-phase power distribution system.

20. The active neutral current compensator of claim 15 wherein said magnetic coupling means further comprises a three-phase neutral-forming autotransformer.

21. An active neutral current compensator for controlling a zero-sequence current in at least one conductor of a multi-phase power distribution system comprising:
   a. magnetic coupling means, connected to said multi-phase power distribution system for coupling said multi-phase power distribution system to said active neutral current compensator;
   b. current sensing means, connected with said at least one conductor, for producing a control signal representative of said zero-sequence current;
   c. compensating means, connected between said magnetic coupling means and said at least one conductor and connected to said sensing moans, for forcing said zero-sequence current to be generally zero, said compensating means being responsive to said control signal of said sensing means; and
   d. wherein said magnetic coupling means further comprises a grounded-wye/unloaded-delta transformer.

22. The active neutral current compensator of claim 15 wherein said magnetic coupling means further comprises a zig-zag autotransformer.

23. The active neutral current compensator of claim 16 wherein said cancelling means further comprises a controllable voltage source.

24. A method for compensating at least one of zero-sequence phase and zero-sequence neutral currents in multiple phase electrical distribution systems comprising the steps of:
 a. sensing a current in at least one conductor of such multiple phase electrical distribution system;
 b. controlling an impedance in a zero-sequence current path of such multiple phase electrical distribution system, said controlling responsive to said current sensed in said at least one conductor so that said impedance shunts such at least one of zero-sequence phase and zero-sequence neutral currents to ground;
 c. controlling a controllable voltage source to produce a voltage proportional to and representative of a transformer equivalent zero-sequence impedance, and
 d. cancelling said transformer equivalent zero-sequence impedance.

25. The method of claim 24 wherein said sensing further comprises the step of sensing a current in a neutral line of such multiple phase electrical distribution system.

26. The method of claim 24 wherein said sensing further comprises the step of sensing a current in at least one phase line of such multiple phase electrical diStribution system.

* * * * *